United States Patent
Taguchi et al.

(10) Patent No.: US 7,593,067 B2
(45) Date of Patent: Sep. 22, 2009

(54) ELECTRO-OPTICAL DEVICE AND ELECTRONIC EQUIPMENT HAVING TOUCH PANEL WITH RESIN HAVING PARTICULAR ELASTIC MODULUS

(75) Inventors: Satoshi Taguchi, Tottori (JP); Shinji Sakurai, Matsumoto (JP); Tsukasa Funasaka, Shiojiri (JP)

(73) Assignee: Seiko Epson Corporation (JP)

(*) Notice: Subject to any disclaimer, the term of this patent is extended or adjusted under 35 U.S.C. 154(b) by 244 days.

(21) Appl. No.: 11/657,974

(22) Filed: Jan. 25, 2007

(65) Prior Publication Data
US 2007/0171326 A1  Jul. 26, 2007

(30) Foreign Application Priority Data
Jan. 26, 2006  (JP) ................................ 2006-017330

(51) Int. Cl.
- G02F 1/1335 (2006.01)
- G02F 1/1333 (2006.01)
- G06F 3/041 (2006.01)
- G06F 3/043 (2006.01)

(52) U.S. Cl. .......................... 349/12; 349/160; 345/173; 345/177

(58) Field of Classification Search .................. 349/12, 349/160
See application file for complete search history.

(56) References Cited

U.S. PATENT DOCUMENTS

| | | | |
|---|---|---|---|
| 6,369,865 B2 | 4/2002 | Hinata | |
| 6,563,554 B2 * | 5/2003 | Okamoto et al. | 349/12 |
| 6,621,635 B1 * | 9/2003 | Yano | 359/599 |
| 7,161,639 B2 * | 1/2007 | Nishiyama et al. | 349/12 |
| 7,190,416 B2 * | 3/2007 | Paukshto et al. | 349/12 |
| 2004/0239647 A1 | 12/2004 | Endo | |

FOREIGN PATENT DOCUMENTS

| | | |
|---|---|---|
| EP | 1 087 286 A1 | 3/2001 |
| JP | 03-238519 | 10/1991 |
| JP | 3010669 | 12/1999 |
| JP | 2004-348686 | 12/2004 |

* cited by examiner

Primary Examiner—Michael H Caley
(74) Attorney, Agent, or Firm—Harness, Dickey & Pierce, P.L.C.

(57) ABSTRACT

An electro-optical device includes: an electro-optical panel having a first substrate, a second substrate, and an electro-optical substance interposed between the first and the second substrates; a third substrate arranged on the second substrate; a fourth substrate having a flexibility and arranged on the third substrate via a spacer; a position detector provided on the third substrate and detecting a pressed position on the fourth substrate based on changes in surface waves generated on the third substrate; and a resin film provided on the fourth substrate and opposed to the third substrate.

16 Claims, 7 Drawing Sheets

ELECTRO-OPTICAL DEVICE AND ELECTRONIC EQUIPMENT HAVING TOUCH PANEL WITH RESIN HAVING PARTICULAR ELASTIC MODULUS

CROSS-REFERENCE TO RELATED APPLICATION

This application claims priority to Japanese Patent Application No. 2006-017330, filed Jan. 26, 2006, the content of which are incorporated herein by reference.

BACKGROUND

1. Technical Field

This invention relates to an electro-optical device and to electronic equipment.

2. Related Art

In recent years, accompanying the diffusion of compact electronic information equipment such as the personal digital assistant (PDA) and palm-top computer, liquid crystal display devices in which touch panels are mounted as input devices on a liquid crystal display panel have come into wide use.

As an example of this touch panel, there is known to be an ultrasonic surface acoustic wave system provided with a glass substrate, a transmitter that generates surface acoustic waves on the surface of the glass substrate, and a receiver that detects the generated surface acoustic waves.

The surface acoustic waves that are propagated on the surface of the glass substrate are attenuated at the touched position when the user touches the surface of the glass substrate with a finger or the like. With touch panels of the ultrasonic surface acoustic wave system, the position touched by the user is detected using the properties pertaining to the attenuation of surface acoustic waves at the touched position.

With ordinary touch panels of the ultrasonic surface acoustic wave system, surface acoustic waves are generated on the outermost surface. Consequently, in the case where water droplets, oil droplets, dust or the like adhere to the outermost surface, the surface acoustic waves are attenuated. That is, with touch panels of the ultrasonic surface acoustic wave system, it is possible that the locations of adherence of water droplets, oil droplets, dust or the like will be mistakenly detected as positions that have been touched by the finger or the like of the user.

There is the problem that a touch panel device configured from one sheet of glass is weak in shock resistance, and particularly that it can be split by minor shocks if thinner glass is contrived.

Accordingly, a touch panel has been proposed that disposes transparent resin film or the like on the outermost surface of the glass substrate on which surface acoustic waves are propagated.

For example, Japanese Unexamined Patent Application, First Publication No. 2004-348686 discloses a touch panel provided with a glass substrate which propagates surface acoustic waves, transducers which transmit and receive surface acoustic waves and which are arranged so as to form a mutually opposing pair at the periphery of this glass substrate, a means for detecting the touch position of a physical object that makes contact within a prescribed operational area based on surface acoustic waves received by the transducers, and a transparent resin film which is arranged with interposition of a space layer relative to the glass substrate, and which has multiple dot spacers formed on the substrate-opposing face of the glass substrate.

In addition to transparent resin film, a transparent glass substrate or the like may also be used for protecting the outermost surface of the substrate which propagates the surface waves.

In such a touch panel configuration, the transparent substrate that propagates the surface acoustic waves is covered by the transparent resin film, and is not exposed. Consequently, malfunctions due to flaws, water droplets and other contamination are prevented, and shattering due to splintering of the glass substrate is prevented.

In the aforementioned patent literature, the outer face of the transparent resin film is the input face that the user presses. At the time of input, the specified position of the outer face of the transparent resin film is pressed, and the transparent resin film bends. The bent part of the transparent resin film contacts the surface of the glass substrate, causing attenuation of the surface acoustic waves that are propagated on the glass substrate surface. The transducers detect the position pressed by the user based on the attenuation factor of these surface acoustic waves.

However, the elastic modulus (Young's modulus) of the transparent resin film (glass substrate) is comparatively high. When the transparent resin film does not adequately bend in response to user pressure, it is not possible to cause attenuation of the surface acoustic waves that are propagated on the surface of the glass substrate. In such a case, there is the problem that the position pressed by the user cannot be accurately detected, and input malfunctions occur.

SUMMARY

An advantage of some aspects of the invention is to provide an electro-optical device and electronic equipment which accurately detect the position at which the user imparts pressure, and which prevent input malfunctions.

An electro-optical device according to a first aspect of the invention includes: an electro-optical panel having a first substrate, a second substrate, and an electro-optical substance interposed between the first and the second substrates; a third substrate arranged on the second substrate; a fourth substrate having a flexibility and arranged on the third substrate via a spacer; a position detector provided on the third substrate and detecting a pressed position on the fourth substrate based on changes in surface waves generated on the third substrate; and a resin film provided on the fourth substrate and opposed to the third substrate.

According to the first aspect, the third substrate, the fourth substrate, the position detector and the resin film constitute a touch panel of the so-called ultrasonic wave system. The touch panel of the ultrasonic wave system generates surface waves on the substrate by sound waves which are ultrasonic waves or the like, and detects the position at which pressing by an object of input occurs by the position detector based on changes in the surface waves. The surface waves are waves that are propagated without emitting energy along the boundary between two different mediums. As the aforementioned object of input, one may cite a finger, touch pen or the like of the operator conducting the input.

In this electro-optical device, the outer face side of the flexible fourth substrate (the face opposite the third substrate side) is the input face which is pressed by the user. By imparting pressure to the input face of the fourth substrate, the resin film and the fourth substrate bend toward the third substrate. The bent part of the resin film contacts the third substrate. The contact area of the third substrate and the bent portion of the resin film is expanded by having the resin film absorb the stress due to the application of pressure. The surface waves that are propagated over the surface of the third substrate are blocked by the contact portion of the resin film and the third substrate, and are sufficiently changed (attenuated) at this contact portion. The position detector detects the pressed position with a high degree of accuracy based on the position where the surface waves are changed.

In this electro-optical device, the surface waves are generated on the surface of the third substrate (between the third and the fourth substrates), and are propagated over the surface. As the surface of the third substrate which propagates the surface waves is not exposed to the outside, it is possible to prevent foreign matter, impurities and the like from adhering to the surface. Furthermore, one is able to prevent changes in the surface waves due to the adhesion of foreign matter, impurities and the like to the surface. As a result, it is possible to prevent the malfunctioning of the touch panel.

Here, an electro-optical device is collectively referred to not only as a device that changes the refractive index of a substance by an electric field and that has electro-optical effects by changing the transmittance of light, but also as a device that converts electrical energy to optical energy, and so on. Specifically, there are liquid crystal display devices using liquid crystal as the electro-optical substance, organic EL devices using organic electro-luminescence as the electro-optical substance, plasma display devices using plasma gas as the electro-optical substance, and so on. Furthermore, there are electrophoretic display devices (EPD: electrophoretic display), field emission display devices (FED: field emission display), electrochromic display devices (ECD: electrochromic display), and so on.

In this electro-optical device, it is preferable that the electro-optical panel be a liquid crystal display panel, that the electro-optical substance be a liquid crystal, that a first polarization plate be arranged on the fourth substrate, and that a second polarization plate be arranged on the first substrate.

According to this configuration, the first polarization plate is arranged on the fourth substrate. Consequently, even in the case where, for example, the fourth substrate (i.e., the touch panel) is damaged by the shock of pressing or the like, the shattering of fragments of the damaged fourth substrate (i.e., the touch panel) to the outside is prevented.

In this electro-optical device, it is preferable that Young's modulus of the resin film be smaller than that of the fourth substrate and the first polarization plate.

According to this configuration, the contact area of the third substrate and the resin film is increased, and the surface waves can be adequately attenuated.

An electro-optical device according to a second aspect of the invention includes: an electro-optical panel having a first substrate, a second substrate, and an electro-optical substance interposed between the first and the second substrates; a third substrate having a flexibility and arranged on the second substrate via a spacer; a position detector provided on the second substrate and detecting a pressed position on the third substrate based on changes in surface waves generated on the second substrate; and a resin film provided on the third substrate and opposed to the second substrate.

In this electro-optical device, the second substrate, the third substrate, the position detector and the resin film constitute a touch panel. The second substrate also constitutes the electro-optical panel. This is advantageous from the standpoint of realizing a thinner electro-optical device. Moreover, with this configuration, it is possible to obtain the same effects as with the electro-optical device according to the first aspect.

In this electro-optical device, it is preferable that the electro-optical panel be a liquid crystal display panel, that the electro-optical substance be a liquid crystal, that a first polarization plate be arranged on the third substrate, and that a second polarization plate be arranged on the first substrate.

In this configuration, the first polarization plate is arranged on the third substrate. Consequently, even in the case where, for example, the third substrate (i.e., the touch panel) is damaged by the shock of pressing or the like, the shattering of fragments of the damaged first substrate (i.e., the touch panel) to the outside is prevented.

In this electro-optical device, it is preferable that Young's modulus of the resin film be smaller than that of the third substrate and the first polarization plate.

According to this configuration, the contact area of the second substrate and the resin film is increased, and the surface waves can be adequately attenuated.

An electro-optical device according to a third aspect of the invention includes: an electro-optical panel including a first substrate, a second substrate, and an electro-optical substance interposed between the first and the second substrates; a third substrate arranged on the second substrate; a resin film arranged on the third substrate via a spacer; and a position detector provided on the third substrate and detecting a pressed position on the resin film based on changes in surface waves generated on the third substrate.

In this electro-optical device, the outer face of the resin film (the face opposite the third substrate side) is the input face that is pressed by the user. With this configuration, the contact area of the resin film portion and the third substrate can be expanded due to the lower Young's modulus of the resin film. The surface waves propagated on the surface of the third substrate are blocked at the contact portion of the resin film and the third substrate, and are adequately changed (attenuated) at this contact portion. The position detector detects the pressed position with a high degree of accuracy based on the position at which the surface waves are changed.

In this electro-optical device, it is preferable that the electro-optical panel be a liquid crystal display panel, that the electro-optical substance be a liquid crystal, that the first polarization plate be arranged on the resin film, and that the second polarization plate be arranged on the first substrate.

According to this configuration, the first polarization plate is arranged on the resin film. Consequently, even in the case where, for example, the touch panel is damaged by the shock of pressing or the like, the shattering of fragments of the damaged touch panel to the outside is prevented.

Moreover, in this electro-optical device, it is preferable that Young's modulus of the resin film be smaller than that of the first polarization plate.

According to this configuration, it is possible to expand the contact area of the third substrate and the resin film, and to adequately attenuate the surface waves.

In this electro-optical device, it is preferable that the Young's modulus (elastic modulus) of the resin film be 4 GPa or less.

The position detector detects the position at which the surface waves are changed as the position where the touch panel is pressed. Here, the change in surface waves signifies the attenuation factor of the surface waves propagated over the substrate surface. The position detector detects the surface waves that are propagated in a prescribed direction on the substrate surface, and calculates the position at which the touch panel is pressed based on the attenuation factor of these detected surface waves. As elastic surface waves generally are from several MHz to several tens of MHz, and as the detection voltage is also very small, there are cases where the signals of surface waves are changed at a position that is not pressed due, for example, to the effects of electromagnetic noise or the like occurring in a different part of the product. This becomes noise that causes the touch panel to malfunction. The threshold value of the attenuation factor of surface waves due to noise is generally on the order of 5%, and when this attenuation factor is converted into Young's modulus, it exceeds 4 GPa.

According to the aforementioned configuration, the Young's modulus of the resin film is 4 GPa or less. Consequently, the attenuation factor of the surface waves due to pressing exceeds 5%. It is possible to reliably distinguish between the attenuation factor of surface waves due to pressing and the attenuation factor of surface waves due to noise, because the threshold value of the attenuation factor of surface waves due to pressing is larger than the attenuation factor of surface waves due to noise. By this means, touch panel malfunctioning can be prevented.

In this electro-optical device, it is preferable that the resin film be polyethylene.

The elastic modulus of polyethylene is generally 0.6 GPa, which exceeds 20% when converted into an attenuation factor. It is possible to reliably distinguish between the attenuation of surface waves due to pressing and the attenuation of surface waves due to noise, because the attenuation factor of surface waves with polyethylene is larger than the attenuation factor of surface waves due to noise.

Electronic equipment according to a fourth aspect of the invention includes the aforementioned electro-optical device.

According to the electronic equipment, an electro-optical device is provided that prevents malfunctioning and that prevents the shattering of the touch panel. Consequently, it is possible to offer electronic equipment of high performance and high reliability.

DESCRIPTION OF EXEMPLARY EMBODIMENTS

First Embodiment

Liquid Crystal Display Device

Figure 1:
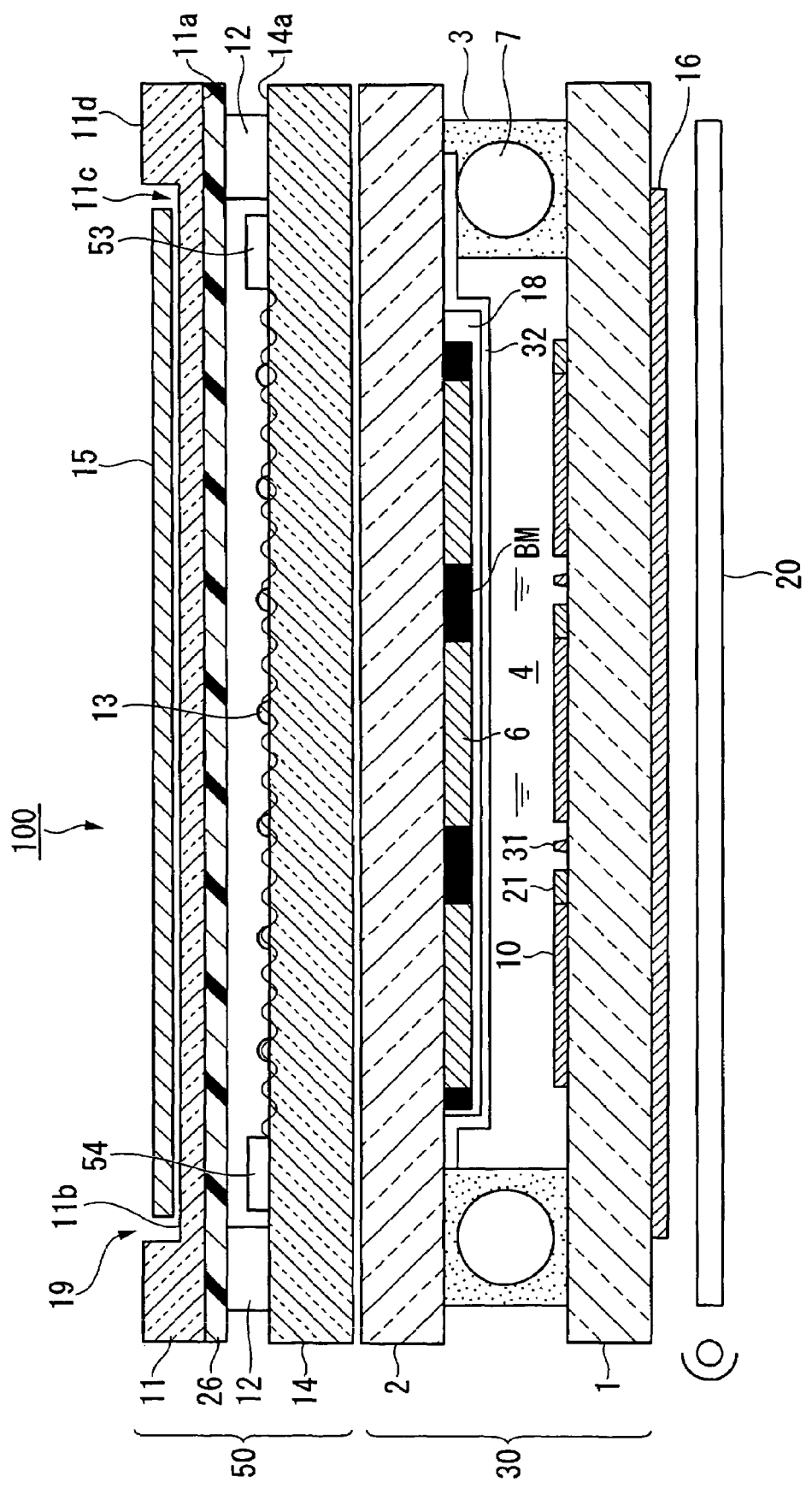
FIG. 1 is a sectional view showing the schematic configuration of a liquid crystal display device having the touch panel pertaining to the first embodiment.

First, an explanation is given regarding the configuration of a liquid crystal display device having the touch panel pertaining to the first embodiment of the present invention. FIG. 1 is a sectional view that schematically shows the schematic configuration of a liquid crystal display device 100 having the touch panel pertaining to the first embodiment. In each of the drawings used in the following descriptions, the scale of the various members has been suitably modified to give each member a size that is readily perceivable.

Roughly speaking, the liquid crystal display device 100 (electro-optical device) of FIG. 1 is composed of a liquid crystal display panel 30 (electro-optical panel) and a touch panel 50.

First, an explanation is given regarding the configuration of the liquid crystal display panel. Additionally, the faces of an element substrate 1 and color filter substrate 2 on a liquid crystal layer 4 side is referred to as inner faces, and the faces on the opposite side relative to the liquid crystal layer 4 are referred to as outer faces.

A liquid crystal display panel 30 has a color filter substrate 2 (first electro-optical panel substrate) and an element substrate 1 (second electro-optical panel substrate) arranged opposite the color filter substrate 2, which are pasted together via a frame-shaped sealing member 3. A liquid crystal layer 4 (electro-optical substance) is formed by the infusion of liquid crystal between the element substrate 1 and the color filter substrate 2. A conducting member 7 composed of multiple gold particles or the like is intermixed with this frame-shaped sealing member 3.

The color filter substrate 2 is formed from glass or the like. Colored layers 6 composed of R (red), G (green) or B (blue) are formed on the inner face of the color filter substrate 2. The color filter is constituted by these colored layers 6. In order to prevent the intrusion of light, black shield layers BM are formed between the neighboring colored layers 6.

A protective layer 18 composed of transparent resin or the like is formed on the colored layers 6 and black shield layers BM. This protective layer 18 has the function of leveling the steps in the color filter between the respective colors. Furthermore, the protective layer 18 has the function of protecting the colored layers 6 from corrosion and contamination due to chemicals and the like used during the process of manufacturing the liquid crystal display device 100. A transparent electrode 32 of stripe-shaped ITO (indium-tin oxide) or the like is formed on the surface of the protective layer 18. One end of this transparent electrode 32 extends into the sealing member 3, and is electrically connected to the conducting member 7 inside the sealing member 3.

On the other hand, the element substrate 1 is formed from glass or the like. Scanning lines 31 are formed at fixed intervals on the inner face of the element substrate 1. TFD elements 21 that serve as switching elements and pixel electrodes 10 are formed for each subpixel on the inner face of the element substrate 1. The scanning lines 31 are electrically connected to the pixel electrodes 10 via the corresponding TFD element 21. The liquid crystal display panel 30 applies voltage between the pixel electrodes 10 and transparent electrode 32, and conducts graduated display by changing optical permeability by controlling the orientation of the liquid crystal of the liquid crystal layer 4. With respect to the switching elements, one is not limited to TFD (thin film diode) elements, and TFT (thin film transistor) elements may also be used.

An illuminator 20 that functions as a backlight is arranged on the outer face side of the element substrate 1 (the face on the opposite side from the liquid crystal layer 4). The illuminator 20 has a light source—specifically, LEDs (light emitting diodes) which are point-like light sources—and a light conductor that converts the point-like light emitted from the LEDs into planar light, and emits it. The light emitted from each LED is directed into the light conductor, and the planar light from the light emission face of the light conductor is emitted in the direction of liquid crystal display panel 30.

Next, the configuration of the touch panel 50 is described.

The touch panel 50 is a touch panel of the ultrasonic surface acoustic wave system. It has a first touch panel substrate 11, second touch panel substrate 14, resin film 26, transmitters 54 (51), and receivers 53 (52) (position detection means).

The second touch panel substrate 14 is arranged on the outer face side of the color filter substrate 2 of the liquid crystal display panel 30 (the face side of the color filter substrate 2 which is opposite the liquid crystal layer 4 side). The first touch panel substrate 11 is arranged opposite the second touch panel substrate 14 via the spacers 12. The first touch panel substrate 11 and the second touch panel substrate 14 are formed from transparent material such as glass. The outer face 11 b of the first touch panel substrate 11 (the face of the first touch panel substrate 11 on the side opposite the face that is opposite the color filter substrate 2) has a coordinate input face 19 where the user actually conducts input with a finger or the like. That is, the outer face side of the first touch panel substrate 11 is the side where the user views images, and inputs information.

A depressed part 11c on which the part corresponding to the coordinate input face 19 is selectively etched is formed on the outer face side of the first touch panel substrate 11. The depressed part 11c of this first touch panel substrate 11 is made thinner than the peripheral parts 11d that are not etched. As a result, the shape of the first touch panel substrate 11 has a flexible thin part that permits the second touch panel substrate 14 to be contacted when pressing is conducted by the user.

A resin film 26 is formed on the inner face 11a of the first touch panel substrate 11 (the face of the first touch panel substrate 11 which lies opposite the second touch panel substrate 14). As the material of the resin film 26, one may use, for example, polyethylene. The Young's modulus (elastic modulus) of this resin film 26 is 0.6 GPa. As the material of the resin film 26, one is not limited to polyethylene, and materials with which the elastic modulus of the resin film 26 is 4 GPa or less may be used.

The spacers 12 are arranged along the peripheral parts (the non-display regions) of the second touch panel substrate 14. The second touch panel substrate 14 and the resin film 26 are fixed in place by the spacers 12. The first touch panel substrate 11 and the second touch panel substrate 14 are held in place with a uniform interstitial opening via the spacers 12. By this means, it is possible to prevent the occurrence of malfunctioning and Newton's rings when there is no pressing. It is also acceptable to form the resin film 26 so that the peripheral parts of the first touch panel substrate 11 are exposed, and to arrange the spacers 12 on this exposed first touch panel substrate 11.

Transmitters 54 (51) that transmit surface acoustic waves and receivers 53 (52) that receive the transmitted surface acoustic waves are provided on the inner face 14a of the second touch panel substrate 14 (the face of the second touch panel substrate 14 which is opposite the first touch panel substrate 11). The surface acoustic waves are generated on the face 14a of the second touch panel substrate 14.

Multiple projections 13 that serve as spacer members are formed at equal intervals on the inner face 14a of the second touch panel substrate 14. As the first touch panel substrate 11 is flexible, there is the possibility that it may bend or curve even when it is not pressed by a finger of the like of the user. By forming the projections 13 on the resin film 26, it is possible to prevent contact between the first touch panel substrate 11 and the resin film 26 even in the case where the first touch panel substrate 11 bends when it is not pressed. As a result, it is possible to prevent the malfunctioning of the touch panel 50. As the projections 13 may be formed on the resin film 26 of the inner face 11a of the first touch panel substrate 11, they may be formed on either of the faces.

An upper polarization plate 15 (first polarization plate) is arranged in the depressed part 11c etched into the outer face 11b of the first touch panel substrate 11 of the touch panel 50. The first touch panel substrate 11 of the touch panel 50 is a transparent material such as glass, and has high optical permeability. The light from the illuminator 20 is transmitted through the liquid crystal display panel 30, and isotropically passes through the first touch panel substrate 11 of the touch panel 50. Even though the upper polarization plate 15 is arranged in such a position, its function as a polarization plate of the liquid crystal display panel 30 is not impaired. By arranging the upper polarization plate 15 in the depressed part 11c of the first touch panel substrate 11, the strength of the first touch panel substrate 11 is enhanced, and the fracturing of the first touch panel substrate 11 is suppressed. Even in the case where the first touch panel substrate 11 fractures, its shattering can be prevented. By arranging the upper polarization plate 15 in the depressed part 11c of the first touch panel substrate 11, it is also possible to realize a thinner liquid crystal display device 100. On the other hand, a lower polarization plate 16 (second polarization plate) is arranged on the outer face side of the element substrate 1 of the liquid crystal display panel 30.

The touch panel 50 adheres to the liquid crystal display panel 30 by the sealant 8. The sealant 8 is applied in a frame shape to the peripheral part (non-display region) of the outer face of the color filter substrate 2 of the liquid crystal display panel 30.

As explained above, in the present embodiment, the touch panel 50 and the liquid crystal display panel 30 are integrated to configure a liquid crystal display device 100 having a touch panel function.

Figure 2:
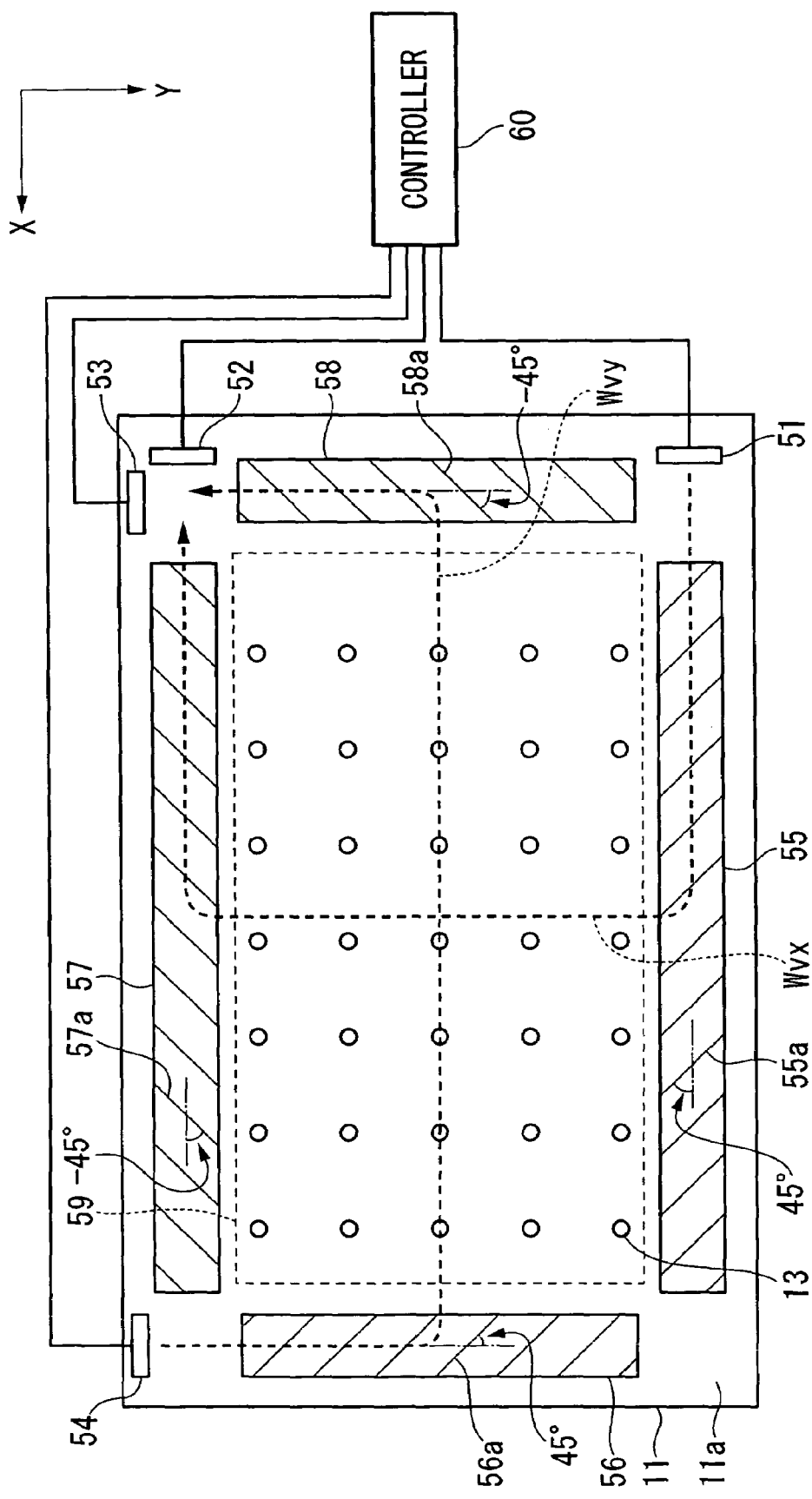
FIG. 2 is a plan view showing the schematic configuration of the inner face side of the sheet substrate of the touch panel.

Next, a description is given of the configuration of the inner face 14a of the second touch panel substrate 14 of the touch panel 50. FIG. 2 is a plan view showing the schematic configuration of the inner face 14a of the second touch panel substrate 14 of the touch panel 50.

The touch panel 50 has an input correspondence face 59, which corresponds to the coordinate input face 19 on the outermost surface, on the central part of the inner face 14a of the second touch panel substrate 14. On the corner parts of the inner face 14a are arranged an X transmitter 51 (position detection means) which generates the surface acoustic wave Wvx shown by the broken arrow line in the X axis direction, and a Y transmitter 54 (position detection means) which generates the surface acoustic wave Wvy shown by the broken arrow line in the Y axis direction. The transmitters generate the surface acoustic waves Wvx and Wvy by converting bulk waves generated by a piezoelectric vibrator which is not illustrated in the drawing into surface waves with the specified directions of the X axis direction and Y axis direction. Moreover, on another corner part of the inner face 14a are arranged an X receiver 52 (position detection means) which detects the surface acoustic wave Wvx generated by the X transmitter 51, and the Y receiver 53 which detects the surface acoustic wave Wvy generated by the Y transmitter 54 (position detection means). The X transmitter 51 and Y transmitter 54 function as the surface acoustic wave transmission means of the present invention, while the X receiver 52 and Y receiver 53 function as the surface acoustic wave reception means of the present invention.

The X transmitter 51, Y transmitter 54, X receiver 52 and Y receiver 53 are electrically connected to a controller 60 (position detection means). The controller 60 supplies drive signals to the X transmitter 51 and Y transmitter 54. By this means, the surface acoustic waves Wvx and Wvy are generated by the X transmitter 51 and Y transmitter 54. The controller 60 calculates the position pressed by the user based on the waveform of the reception signals of the surface acoustic waves Wvx and Wvy received by the X receiver 52 and Y receiver 53.

The surface acoustic wave Wvx generated by the X transmitter 51 is propagated in the X axis direction, and received into a reflection array 55. The reflection array 55 is an array of reflection elements 55a. The reflection elements have the role of changing the direction of propagation of surface acoustic waves by reflecting the surface acoustic waves. Each reflection element 55a in the reflection array 55 is arrayed at an angle of approximately 45 degrees relative to the X axis, and orients the direction of the surface acoustic wave Wvx in the −Y axis direction. The surface acoustic wave Wvx oriented in the −Y axis direction is transmitted as is to the input correspondence face 59, where it is received into a reflection array 57. Each reflection element 57a in the reflection array 57 is arrayed at an angle of approximately −45 degrees relative to the X axis, and serves to orient the surface acoustic wave Wvx in the −X axis direction. The surface acoustic wave Wvx oriented in the −X axis direction by the reflection elements 57a is detected by the X receiver 52.

The surface acoustic wave Wvy generated by the Y transmitter 54 is propagated in the Y axis direction, and is received into a reflection array 56. Each reflection element 56a in the reflection array 56 is arrayed at an angle of approximately 45 degrees relative to the Y axis, and orients the direction of the surface acoustic wave Wvy in the −X axis direction. The surface acoustic wave Wvy oriented in the −X axis direction is transmitted as is to the input correspondence face 59, where it is received into a reflection array 58. Each reflection element 58a in the reflection array 58 is arrayed at an angle of approximately −45 degrees relative to the Y axis, and orients the direction of the surface acoustic wave Wvy in the −Y axis direction. The surface acoustic wave Wvy oriented in the −Y axis direction is detected by the Y receiver 53.

Next, a detailed description is given regarding the resin film 26 of the touch panel 50 of the present embodiment.

Figure 3:
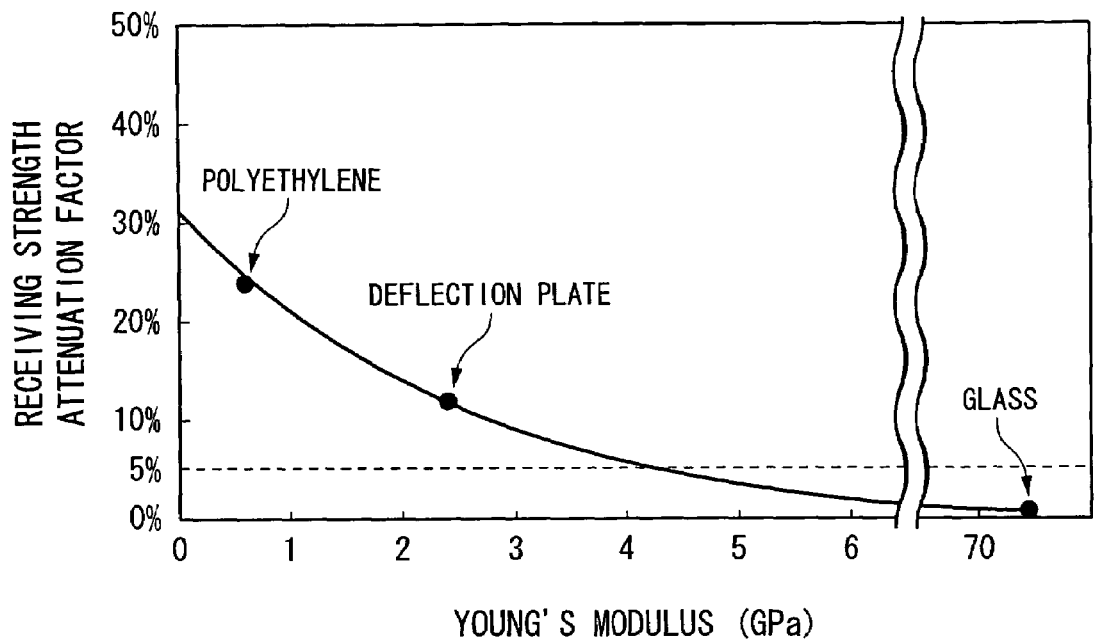
FIG. 3 is a graph showing the relation between the Young's modulus of the resin film and the resin strength attenuation factor.

FIG. 3 is a graph showing the relation between the Young's modulus of the resin film and the reception strength attenuation factor. The horizontal axis of the graph of FIG. 3 shows the Young's modulus, and the vertical axis shows the reception strength attenuation factor. FIG. 3 also shows the Young's modulus of materials and the like other than that used in the resin film 26, under the identical conditions at the time of pressing.

Polyethylene is used in the resin film 26 of the present embodiment, and the Young's modulus of this polyethylene is 0.6 GPa as shown in FIG. 3. Its reception strength attenuation factor exceeds 20%.

The reasons for providing a resin film 26 with a low Young's modulus inside the touch panel 50 are explained here.

As shown in FIG. 2, the surface acoustic waves transmitted from the X transmitter 51 and Y transmitter 54 are propagated over the propagation face of the thin glass, and are detected by the X receiver 52 and Y receiver 53. At such times, there are cases where attenuation occurs at a position where the surface acoustic waves have not been pressed, due to dust adhering to the propagation face of the thin glass, due to the effects of spacers or the like, or due to the effects of electromagnetic waves of circuit blocks such as the liquid crystal panel. As a result, the X receiver 52 and Y receiver 53 detect the attenuation of surface acoustic waves not only at the position pressed by the user, but also at a position that has not been pressed due to the aforementioned influences. The attenuation of surface acoustic waves due to such influences constitutes noise. As shown in FIG. 3, the reception strength attenuation factor of surface acoustic waves due to noise is ordinarily less than 5%, and is in the vicinity of 4 GPa when converted into Young's modulus.

The signal due to noise and the signal due to pressing by the user which are detected by the X receiver 52 and Y receiver 53 are supplied to the controller 60 in an overlapping manner. In order for the controller 60 to distinguish between the attenuation of surface acoustic waves due to noise and the attenuation of surface acoustic waves due to pressing by the user which are detected by the X receiver 52 and Y receiver 53, it is necessary to make the attenuation of surface acoustic waves due to pressing by the user sufficiently larger than the attenuation of surface acoustic waves due to noise.

In the present embodiment, resin film 26 composed of polyethylene with which the reception strength attenuation factor of surface acoustic waves due to pressing is 5% or more is provided inside the touch panel 50.

The resin film 26 of the present embodiments uses material that has a lower Young's modulus than the first touch panel substrate 11 and upper polarization plate 15. Here, the first touch panel substrate 11 is composed of glass. As shown in FIG. 3, the Young's modulus of this first touch panel substrate 11 is from 70 to 77 GPa, and the reception strength attenuation factor is 0.1%. The upper polarization plate 15 is composed, for example, of polyvinyl alcohol (PVOH). As shown in FIG. 3, the Young's modulus of the upper polarization plate 15 is 2 GPa, and the reception strength attenuation factor is 15%. Thus, if the part pressed by the finger of the user were the first touch panel substrate 11 or upper polarization plate 15, there would be cases where the pressed first touch panel substrate 11 or the like would not bend, and where the surface acoustic waves could not be adequately attenuated due to the comparatively high elastic modulus.

Therefore, in the present embodiment, resin film 26 which has a Young's modulus of 0.6 GPa and an attenuation factor in excess of 20% is provided inside the touch panel.

Thus, in the present embodiment, the attenuation factor of the resin film 26 is higher than the reception strength attenuation factor of the surface acoustic waves due to noise, and the Young's modulus of the resin film 26 is lower than that of the first touch panel substrate 11 and upper polarization plate 15. Consequently, it is possible to distinguish between the attenuation of surface acoustic waves due to noise and the attenuation of surface acoustic waves due to pressing by the user. The material of the resin film 26 may be selected at one's discretion as long as it satisfies the aforementioned conditions, and has transparency.

Figure 4:
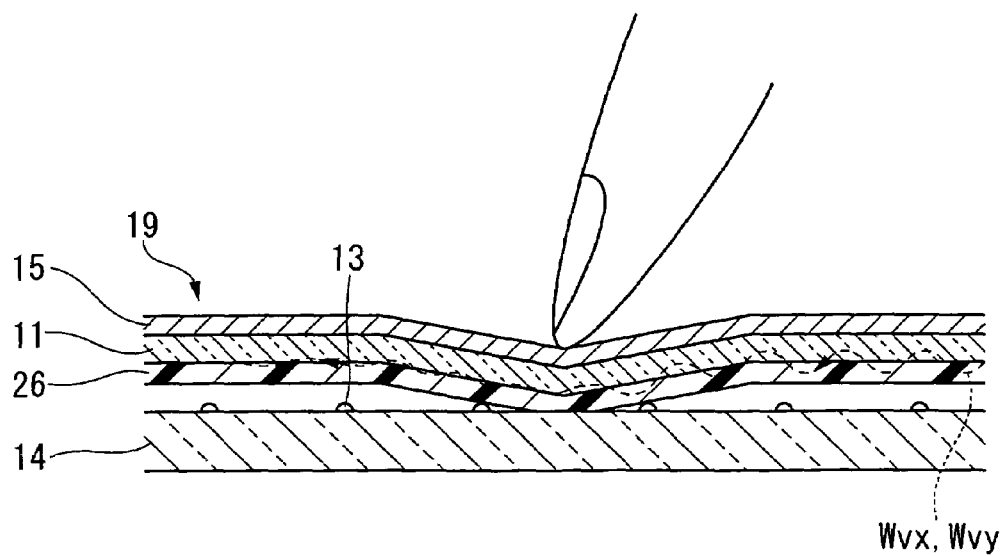
FIG. 4 is a sectional view showing the circumstances when the user presses the touch panel with a finger.

FIG. 4 is a schematic view showing the circumstance where the user presses the touch panel 50 with a finger.

When a finger or the like of the user presses the coordinate input face 19 where the upper polarization plate 15 is installed, the first touch panel substrate 11 and resin film 26 bend together with the upper polarization plate 15 at the position that is pressed. Consequently, the bent part of the resin film 26 and the second touch panel substrate 14 come into contact. The surface acoustic waves Wvx and Wvy which are propagated over the inner face 14a of the second touch panel substrate 14 are absorbed by the contact portion of the bent part of the resin film 26 and the second touch panel substrate 14, and their amplitude is attenuated. The controller 60 calculates the position pressed by the user by calculating the position where these surface acoustic waves Wvx and Wvy are attenuated.

Figure 5:
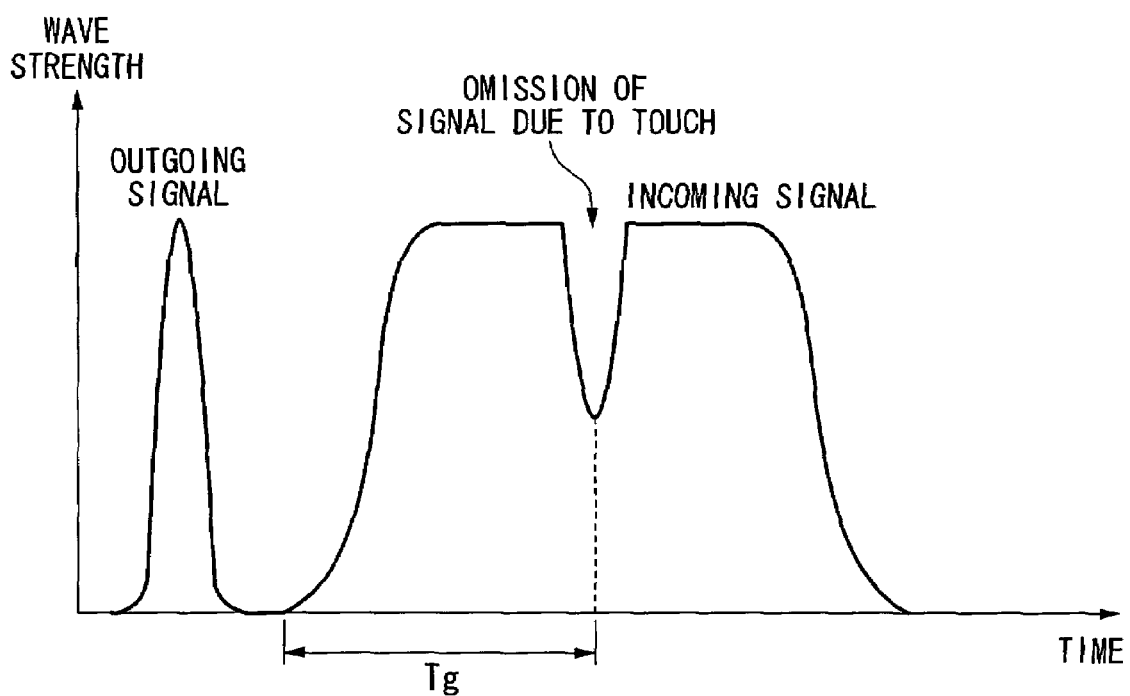
FIG. 5 is a graph showing one example of the envelope waveform of a detected surface acoustic wave.

FIG. 5 is a graph showing one example of the envelope waveform of a detected surface acoustic wave.

In FIG. 5, the horizontal axis shows time, and the vertical axis shows a schematic view of the strength of the surface acoustic waves. In what follows, a description is given regarding the case where the surface acoustic wave Wvx is transmitted from the X transmitter 51 over the surface of the second touch panel substrate 14 as the transmission signal. The surface acoustic wave Wvx transmitted from the X transmitter 51 passes through reflection arrays 55 and 57, and is detected by the X receiver 52. At this time, the respective reflection elements of the reflection arrays 55 and 57 establish a set of multiple paths of different length. The surface acoustic wave Wvx reflected by the respective reflection elements which are continuous in the reflection arrays 55 and 57 gradually transits the lengthening path, and arrives at the X receiver 52. As shown in FIG. 5, compared to the transmission signal, the waveform of the reception signal detected by the X receiver 52 is a trapezoidal waveform whose extent grows over time.

When the user presses a certain specific place on the coordinate input face, the amplitude of the surface acoustic wave Wvx which transits that part is attenuated. As shown in FIG. 5, a signal drop-off occurs in the envelope waveform of the surface acoustic wave Wvx due to the pressing. By measuring the time Tg from detection of the reception signal until occurrence of signal drop-off due to this pressing, it is possible to calculate the attenuation position which is the position where the surface acoustic wave Wvx is attenuated. As a result, it is possible to identify the X coordinate of the pressed site. In the case also where the Y coordinate of the pressed site is identified, the signal drop-off due to pressing shown in FIG. 5 occurs in the envelope waveform of the surface acoustic wave Wvy. In this case, as well, by measuring the time from detection of the reception signal until occurrence of signal drop-off due to this pressing, it is possible to calculate the attenuation position which is the position where the surface acoustic wave Wvy is attenuated, and it is possible to identify the Y coordinate of the pressed site. The controller 60 is programmed to recognize an attenuation factor value higher than the threshold value of the reception strength attenuation factor of noise as attenuation due to pressing by the user. The controller 60 is able to calculate the X coordinate and Y coordinate of the position pressed by the user based on the surface acoustic wave Wvx detected by the X receiver 52 and the surface acoustic wave Wvy detected by the Y receiver 53.

In the present embodiment, the first touch panel substrate 11 and the resin film 26 formed on the inner face 11a bend toward the second touch panel substrate 14 due to the pressing of the input face of the first touch panel substrate 11 of the touch panel 50. The bent part of the resin film 26 contacts the second touch panel substrate 14. The stress due to the pressing in the substrate direction is absorbed by the resin film 26 which has a low elastic modulus. The bending of the resin film 26 expands the area of the contact portion of the resin film 26 and the second touch panel substrate 14. The surface waves propagated over the inner face 14a of the second touch panel substrate 14 are blocked by the contact portion of the resin film 26 and the second touch panel substrate 14, and are adequately changed (attenuated) in this contact portion. The position detection means is able to detect the pressed position with a high degree of accuracy based on the position where the surface waves are changed.

Moreover, in this embodiment, the surface acoustic waves are generated on the inner face 14a of the second touch panel substrate 14 (between the first touch panel substrate 11 and the second touch panel substrate 14), and are propagated over this inner face 14a. As the inner face 14a of the second touch panel substrate 14 where the surface waves are propagated is not exposed to the outside, it is possible to prevent foreign matter, impurities and the like from adhering to the inner face 14a. Furthermore, it is possible to prevent changes in the surface waves due to the adhesion of foreign matter, impurities and the like to the face of the second touch panel substrate 14 where the surface waves are formed. As a result, malfunctions of the liquid crystal display device 100 can be prevented.

Second Embodiment

Next, a second embodiment is described with reference to drawings.

In the foregoing first embodiment, the touch panel is configured from the pairing of a first touch panel substrate and a second touch panel substrate. In contrast, the present embodiment differs in that the touch panel is configured from a single thin-plate substrate. As the remaining basic configuration of the liquid crystal display device is identical to that of the aforementioned first embodiment, the same code numbers are given to shared components, and detailed description thereof is omitted.

Figure 6:
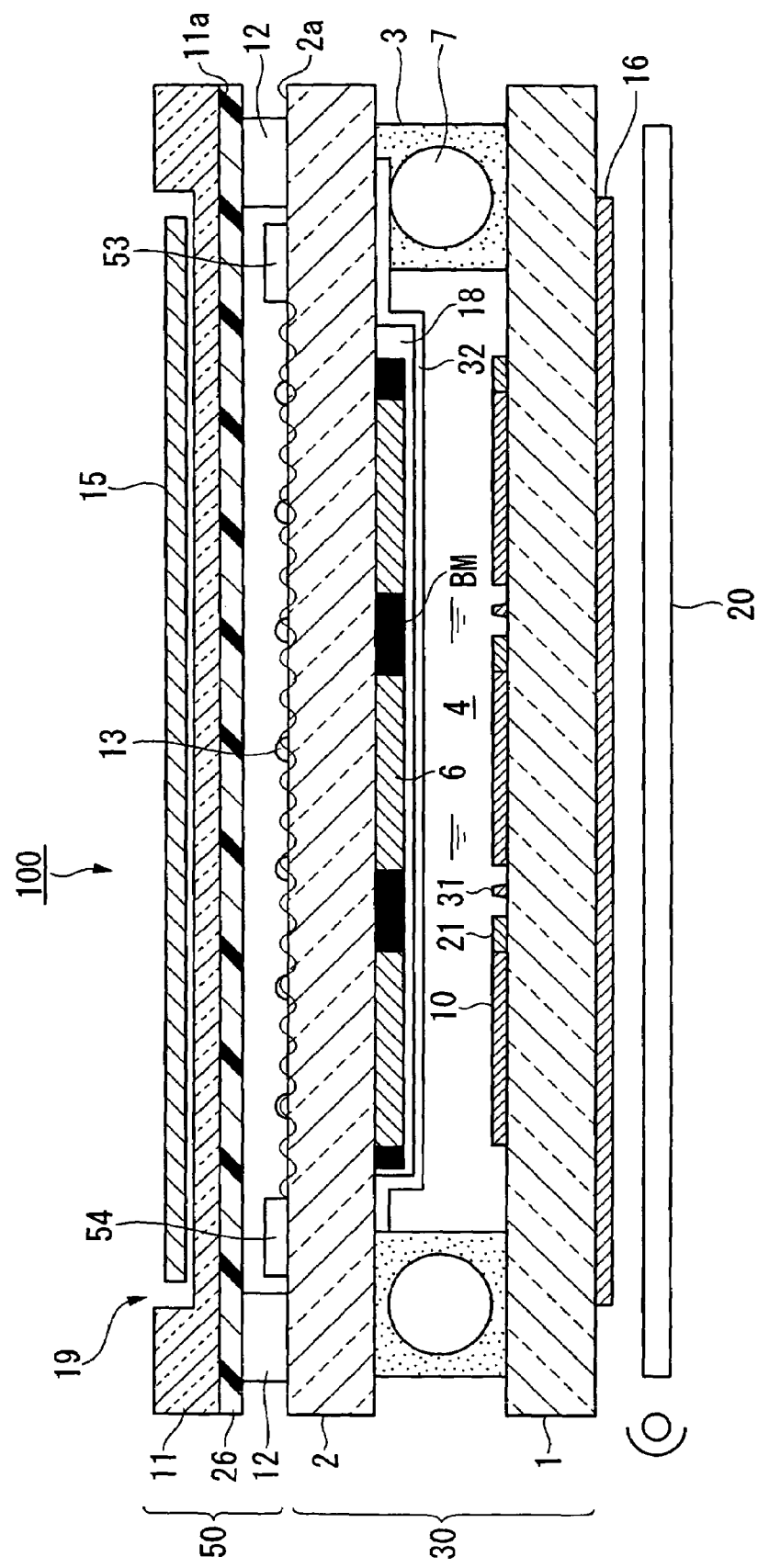
FIG. 6 is a sectional view showing the schematic configuration of a liquid crystal display device having the touch panel pertaining to the second embodiment.

FIG. 6 is a sectional view showing the schematic configuration of the liquid crystal display device 100 pertaining to the present embodiment.

As shown in FIG. 6, a thin-plate substrate 11 (touch panel substrate) is arranged on the outer face 2a side of the color filter substrate 2 of the liquid crystal display panel 30 (the face of the color filter substrate 2 which is opposite the liquid crystal layer 4 side) with the opening of a fixed interstice via spacers.

The resin film 26 is formed over the entire surface of the inner face 11a of the thin-plate substrate 11 (the face of the thin-plate substrate 11 which is opposite the color filter substrate 2). In the present embodiment, the attenuation factor of the resin film 26 is higher than the reception strength attenuation factor of surface acoustic waves due to noise, and the Young's modulus of the resin film 26 is lower than that of the thin-plate substrate 11 and upper polarization plate 15. As the resin film 26, one may use, for example, polyethylene.

Transmitters 54 (51) that transmit surface acoustic waves and receivers 53 (52) that receive the transmitted surface acoustic waves are provided on the outer face 2a of the color filter substrate 2. The surface acoustic waves are generated on the outer face 2a of the color filter substrate 2.

In the present embodiment, as the resin film 26 is provided on the inner face of thin-plate substrate 11 of the touch panel 50, it is possible to obtain the same effects as the aforementioned first embodiment.

Third Embodiment

Next, the present embodiment is described with reference to drawings.

In the foregoing first embodiment, the input part pressed by the finger of the user was configured from a touch panel substrate composed of glass. In contrast, the present embodiment differs in that the input part pressed by the finger of the user is configured from resin film and a polarization plate. As the remaining basic configuration of the liquid crystal display device is identical to that of the aforementioned first embodiment, the same code numbers are given to shared components, and detailed description thereof is omitted.

Figure 7:
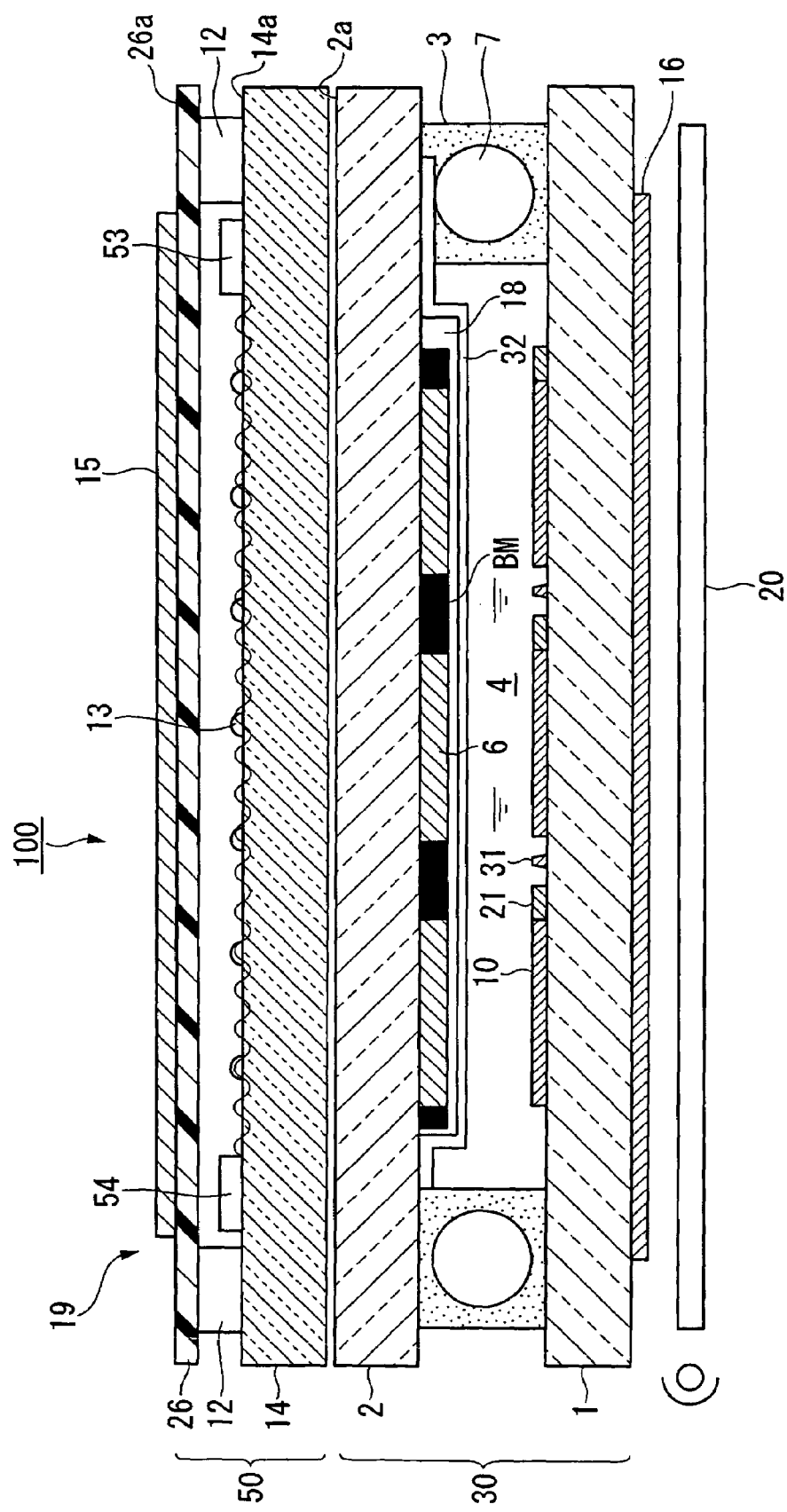
FIG. 7 is a sectional view showing the schematic configuration of a liquid crystal display device having the touch panel pertaining to the third embodiment.

FIG. 7 is a sectional view showing the schematic configuration of a liquid crystal display device 100 pertaining to the present embodiment.

As shown in FIG. 7, the touch panel substrate 14 is arranged on the outer face 2a side of the color filter substrate 2 of the liquid crystal display panel 30 (the face of the color filter substrate 2 which is opposite the liquid crystal layer 4 side).

Transmitters 54 (51) that transmit surface acoustic waves and receivers 53 (52) that receive the transmitted surface acoustic waves are provided on the inner face 14a of the touch panel substrate 14. The surface acoustic waves are generated on the inner face 14a of the touch panel substrate 14.

The resin film 26 is provided on the outer face 2a side of the color filter substrate 2 with the opening of a fixed interstice relative to the touch panel substrate 14 via the spacers 12. The resin film 26 is formed with approximately the same planar rectangular external dimensions as the touch panel substrate 14, and is arranged opposite the touch panel substrate 14. In the present embodiment, the attenuation factor of the resin film 26 is higher than the reception strength attenuation factor of surface acoustic waves due to noise, and the Young's modulus of the resin film 26 is lower than that of the below-mentioned upper polarization plate 15. As the resin film 26, one may use, for example, polyethylene.

The upper polarization plate 15 of the liquid crystal display panel 30 is arranged on the outer face 26a side of the resin film 26 (the face which is opposite the touch panel substrate 14 of the resin film 26). The upper polarization plate 15 may be disposed so as to closely adhere to the resin film 26, or it may be disposed with the opening of a fixed interstice relative to the resin film 26.

In the present embodiment, as the resin film 26 is provided inside the touch panel 50, it is possible to obtain the same effects as the aforementioned first embodiment.

In the present embodiment, the input part pressed by the user is configured from the resin film 26 and the upper polarization plate 15, and a glass substrate is not used. As the elastic modulus of the input part pressed by the user is lower than in the case where a glass substrate is used, the area of the contact portion of the resin film 26 bent by pressing and the touch panel 14 is expanded. Accordingly, the surface acoustic waves that are propagated over the inner face 14a side of the touch panel substrate 14 can be reliably attenuated at the position that is pressed. By this means, malfunctioning of the liquid crystal display device 100 can be prevented.

Electronic Equipment

Next, a description is given regarding one example of electronic equipment of the present invention.

Figure 8:
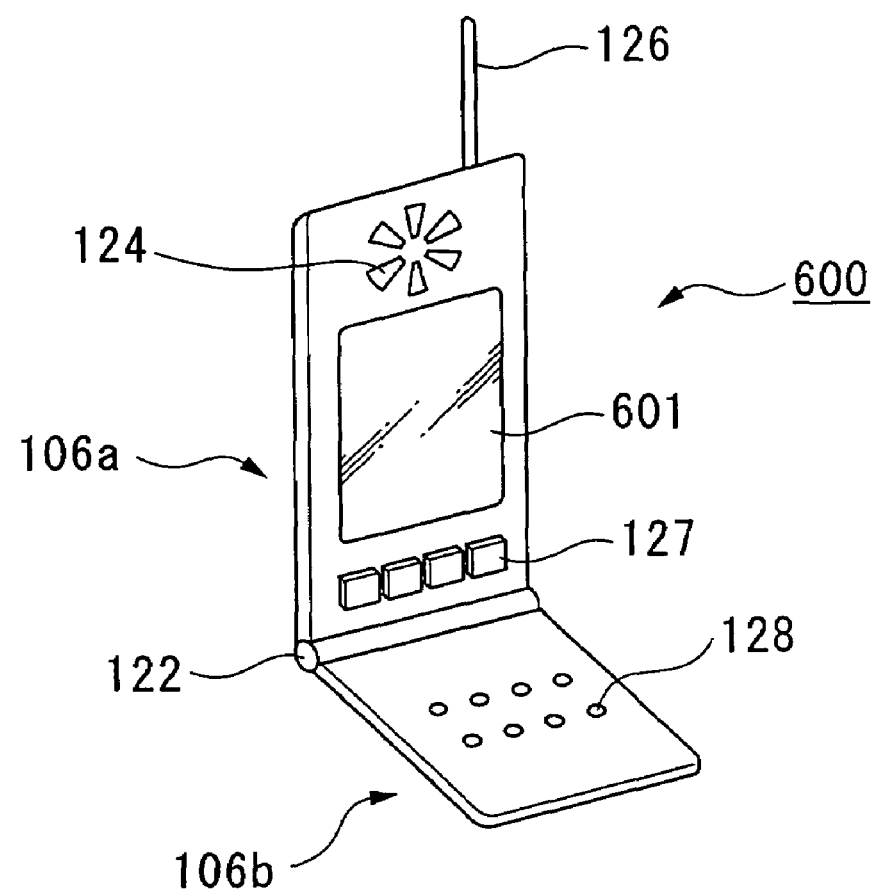
FIG. 8 is an oblique view showing the schematic configuration of a cell phone.

FIG. 8 is an oblique view showing a cell phone (electronic equipment) provided with a liquid crystal display device 100 having the aforementioned touch panel functions.

As shown in FIG. 8, a cell phone 600 is provided with a first body 106a and a second body 106b which are foldable around a hinge 122. The first body 106a is provided with a liquid crystal device 601, multiple control buttons 127, an earpiece 124, and antenna 126. The second body 106b is provided with a mouthpiece 128.

According to the electronic equipment pertaining to the present embodiment, as it is provided with the liquid crystal display device 100 that prevents malfunctions, and that prevents shattering of the glass of the touch panel (the touch panel substrate or first touch panel substrate), it is possible to offer a cell phone 600 with high performance and high reliability.

The liquid crystal display device 100 with the aforementioned touch panel functions can be applied to a variety of electronic equipment apart from the aforementioned cell phone. For example, it is possible to apply it to such electronic equipment as liquid crystal projectors, multimedia-compatible personal computers (PCs) and engineering workstations (EWS), pagers, word processors, televisions, video tape recorders of the viewfinder type or monitor direct-view type, electronic notepads, electronic desktop calculators, car navigation devices, POS terminals, and touch panels.

The technical scope of the present invention is not limited to the aforementioned embodiments, and include various modifications that can be made to the aforementioned embodiments within a scope that does not deviate from the intent of the present invention.

For example, it goes without saying that the touch panel 50 pertaining to the first embodiment and the touch panel 50 pertaining to the second embodiment may be attached not only to the aforementioned liquid crystal display device, but also to other display devices such as organic EL display devices.

What is claimed is:

1. An electro-optical device, comprising:
an electro-optical panel including a first substrate, a second substrate, and an electro-optical substance interposed between the first and the second substrates;
a third substrate arranged on the second substrate;
a fourth substrate made from glass and arranged on the third substrate via a spacer;
a position detector provided on the third substrate and detecting a pressed position on the fourth substrate based on changes in surface waves generated on the third substrate;
a resin film provided on the fourth substrate and opposed to the third substrate; and
a resin plate arranged on the fourth substrate, the fourth substrate having a first side and a second side opposing the first side, the resin film being provided on the first side, the second side having a depressed part in which the resin plate is disposed, the depressed part substantially corresponding to a touch area.

2. The electro-optical device according to claim 1,
wherein the electro-optical panel is a liquid crystal display panel,
the electro-optical substance is a liquid crystal, and
the resin plate is a polarization plate.

3. The electro-optical device according to claim 1, wherein Young's modulus of the resin film is smaller than that of the fourth substrate and smaller than that of the resin plate.

4. The electro-optical device according to claim 1, wherein the Young's modulus of the resin film is 4 GPa or less.

5. The electro-optical device according to claim 1, wherein the resin film is polyethylene.

6. Electronic equipment that comprises the electro-optical device according to claim 1.

7. The electro-optical device according to claim 1, wherein the resin film and the resin plate are made of different materials.

8. An electro-optical device, comprising:
an electro-optical panel including a first substrate, a second substrate, and an electro-optical substance interposed between the first and the second substrates;

a third substrate made from glass and arranged on the second substrate via a spacer;

a position detector provided on the second substrate and detecting a pressed position on the third substrate based on changes in surface waves generated on the second substrate;

a resin film provided on the third substrate and opposed to the second substrate, and a resin plate arranged on the third substrate, the third substrate having a first side and a second side opposing the first side, the resin film being provided on the first side, the second side having a depressed part in which the resin plate is disposed, the depressed part substantially corresponding to a touch area.

9. The electro-optical device according to claim 8, wherein the electro-optical panel is a liquid crystal display panel, the electro-optical substance is a liquid crystal, and the resin plate is a polarization plate.

10. The electro-optical device according to claim 8, wherein Young's modulus of the resin film is smaller than that of the third substrate and smaller than that of the resin plate.

11. Electronic equipment that comprises the electro-optical device according to claim 8.

12. The electro-optical device according to claim 8, wherein the resin film and the resin plate are made of different materials.

13. An electro-optical device, comprising:

an electro-optical panel including a first substrate, a second substrate, and an electro-optical substance interposed between the first and the second substrates;

a touch panel substrate facing the second substrate of the electro-optical panel, and having a coordinate input area where a user actually conducts input;

a position detector provided on the second substrate or on another substrate disposed between the electro-optical panel and the touch panel substrate, the position detector detecting a pressed position on the touch panel substrate based on changes in surface waves generated on the touch panel substrate;

a resin film disposed on a first side of the touch panel substrate, the first side facing the second substrate;

a resin plate disposed on a second side of the touch panel substrate, the second side opposing the first side, wherein the touch panel substrate has a thick portion and a thin portion, the thick portion being supported by the third substrate via a spacer, the thin portion corresponding to the coordinate input area, at least a part of the resin plate being disposed at the thin portion, and wherein Young's modulus of the resin film is smaller than that of the touch panel substrate and smaller than that of the resin plate.

14. The electro-optical device according to claim 13, wherein the electro-optical panel is a liquid crystal display panel, the electro-optical substance is a liquid crystal, the resin plate is a first polarization plate, and a second polarization plate is disposed on the first substrate.

15. The electro-optical device according to claim 13, wherein the touch panel substrate is made of a glass plate.

16. Electronic equipment that comprises the electro-optical device according to claim 13.

\* \* \* \* \*